(12) United States Patent
Oike

(10) Patent No.: US 9,154,820 B2
(45) Date of Patent: Oct. 6, 2015

(54) ENCODING APPARATUS, ENCODING METHOD, AND STORAGE MEDIUM

(75) Inventor: Kenji Oike, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 728 days.

(21) Appl. No.: 13/360,028

(22) Filed: Jan. 27, 2012

(65) Prior Publication Data

US 2012/0195388 A1   Aug. 2, 2012

(30) Foreign Application Priority Data

Jan. 27, 2011  (JP) ................. 2011-014770

(51) Int. Cl.
*H04W 4/00* (2009.01)
*H04N 21/24* (2011.01)
*H04N 21/6379* (2011.01)
*H04N 19/172* (2014.01)
*H04N 19/61* (2014.01)
*H04N 19/114* (2014.01)
*H04N 19/164* (2014.01)

(52) U.S. Cl.
CPC ......... *H04N 21/2402* (2013.01); *H04N 19/114* (2014.11); *H04N 19/164* (2014.11); *H04N 19/172* (2014.11); *H04N 19/61* (2014.11); *H04N 21/6379* (2013.01)

(58) Field of Classification Search
None
See application file for complete search history.

(56) References Cited

U.S. PATENT DOCUMENTS

| 8,194,646 | B2 * | 6/2012 | Elliott et al. | 370/352 |
| 2010/0046451 | A1 * | 2/2010 | Tada et al. | 370/329 |
| 2014/0293782 | A1 * | 10/2014 | Weigand | 370/230 |

FOREIGN PATENT DOCUMENTS

JP    2009188735 A  *  8/2009

* cited by examiner

*Primary Examiner* — Willie J Daniel, Jr.
(74) *Attorney, Agent, or Firm* — Banner & Witcoff, Ltd.

(57) ABSTRACT

Encoded data may be generated and transmitted from one computing device to another via a network. To address bandwidth use efficiency issues, an available bandwidth for the other computing device may be determined or acquired. A time at which the available bandwidth is determined/acquired may be estimated. Media data (e.g., audio, video, etc.) may be encoded for transmission. Scheduled change time, at which a setting of an encoding condition is expected to be changed, is further determined. Change timing, at which the setting of an encoding condition is to be changed, is determined on the basis of the scheduled change time and the estimated time. The setting of the encoding condition may then be changed in accordance with the available bandwidth when the change timing is reached.

15 Claims, 10 Drawing Sheets

ENCODING APPARATUS, ENCODING METHOD, AND STORAGE MEDIUM

CROSS-REFERENCE TO RELATED APPLICATION

This Application claims priority from JP2011-014770 filed on Jan. 27, 2011, the content of which is hereby incorporated by reference.

BACKGROUND OF THE DISCLOSURE

1. Field of the Disclosure

The present disclosure relates to encoding media data depending on a bandwidth between a data transmission source communication apparatus and a transmission destination communication apparatus, as well as a storage medium.

2. Description of the Related Art

The volume of data that a communication apparatus can transmit over a network per unit of time is referred to as an available bandwidth (in bps). The number of bits that a communication apparatus conveys per unit of time over a network is referred to as a transmission bit rate (in bps). A transmission bit rate higher than the available bandwidth causes problems such as data congestion, packet loss, etc. A transmission bit rate lower than or equal to the available bandwidth might not be as susceptible to the problems of data congestion, packet loss, etc. However, if the transmission bit rate is significantly lower than the available bandwidth, the communication apparatus cannot make the best use of the available bandwidth (e.g., efficiency or effectiveness of bandwidth usage may be low). Accordingly, it is preferable that an encoding apparatus that encodes media data performs encoding in accordance with an available bandwidth that changes depending on the circumstances, such as an area, provider, and time zone, to adjust the transmission bit rate.

For example, a known moving-image distribution apparatus measures an available bandwidth by transmitting a fixed volume of moving-image data in burst manner and determining the amount of time required to complete the transmission. The transmission bit rate is adjusted on the basis of this measurement result.

If the setting of encoding conditions is changed to adjust a transmission bit rate to a target value, it takes a substantial amount of time before the transmission bit rate actually attains the target value. Even if the encoding apparatus continuously changes the setting of encoding conditions before the transmission bit rate attains the target value, the transmission bit rate cannot be suitably controlled. That is, suitable timing for changing the setting of encoding conditions might not be achieved. The time required to measure an available bandwidth sometimes changes under the influence of a network environment. Accordingly, it is also difficult for the encoding apparatus to acquire the measurement result of an available bandwidth in time to change the setting of encoding conditions. Thus, encoding apparatuses in the related art cannot change the setting of encoding conditions at suitable timing according to the measurement result of an available bandwidth.

BRIEF SUMMARY

Aspects of the present disclosure provide an ability to change the setting of encoding conditions with suitable timing according to a measurement of an available bandwidth.

An aspect of the present disclosure provides for generation of encoded data to be transmitted to a communication partner via a network by encoding media data; connecting to the communication partner via the network and a processor; determination or acquisition of available bandwidths for the individual communication partners (e.g., communication devices); estimation of times at which the available bandwidths are determined or acquired, wherein the estimation is performed. Aspects described herein further provide for encoding of media data; acquisition or determination of a scheduled change time at which a setting of an encoding condition is expected to be changed; determination of a change timing based on the scheduled change time and the estimated time, wherein the setting of an encoding condition is configured to be changed at the change timing; changing of the setting of the encoding condition in accordance with the available bandwidth when the determined change timing is reached.

BRIEF DESCRIPTION OF THE DRAWINGS

For a more complete understanding of the disclosure, the needs satisfied thereby, and the aspects, features, and advantages thereof, reference now is made to the following description taken in connection with the accompanying drawings.

DETAILED DESCRIPTION

Figure 1:
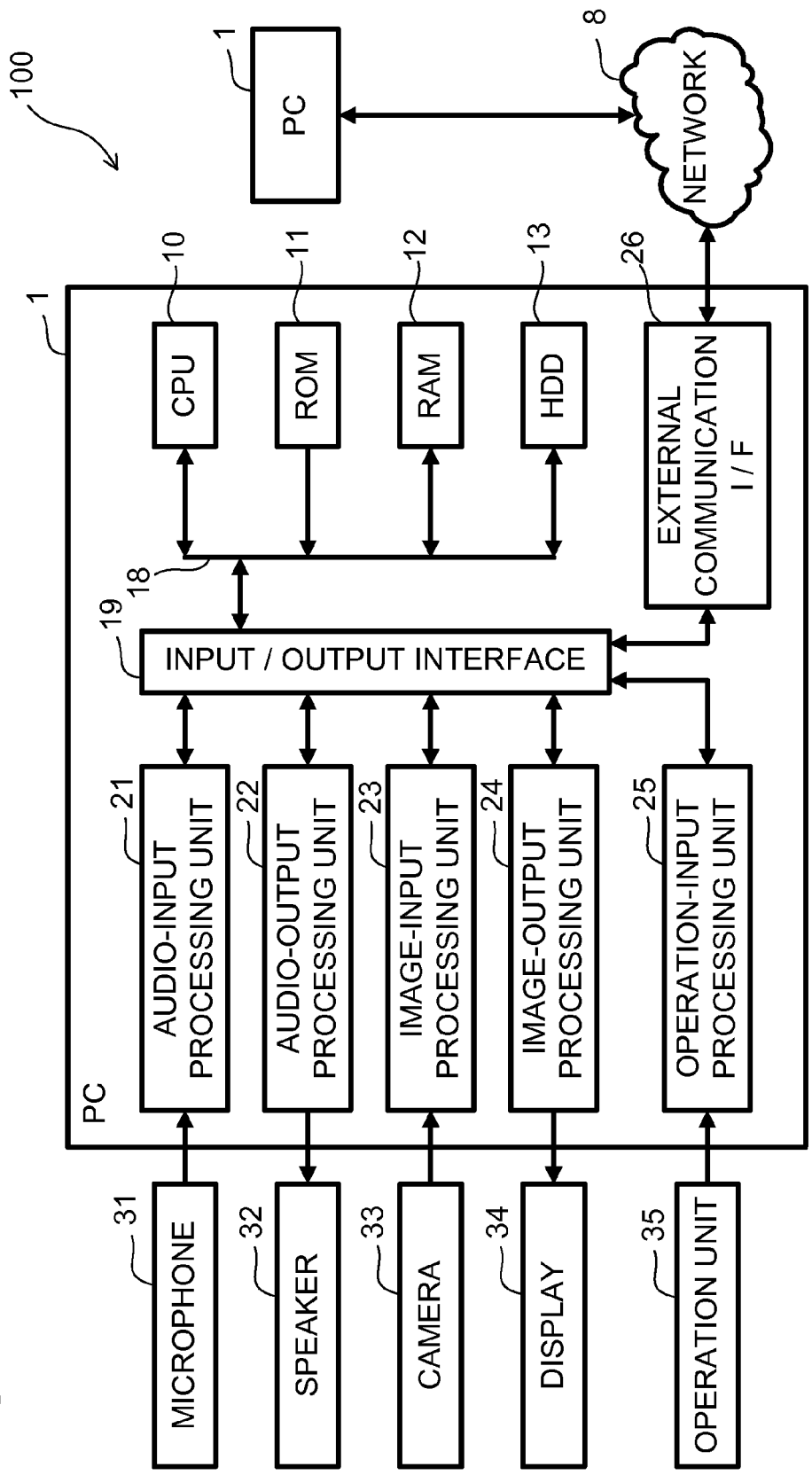
FIG. 1 is a schematic block diagram illustrating an example electrical configuration of a PC and an example configuration of a communication system.

A personal computer (hereinafter referred to as a PC) 1, which is an embodiment of a encoding apparatus of the present disclosure, and a communication system 100 including a plurality of the PCs 1 will be described with reference to the drawings. The reference drawings are used to describe technical features that the present disclosure can employ. The configuration of the apparatus, the flowcharts of various processes, etc. illustrated in the drawings are not intended for limitation and are given as examples only.

As shown in FIG. 1, the communication system 100 includes at least two PCs 1. The PCs 1 connect to each other. The PCs 1 transmit and receive various items of data to and from each other.

The communication system 100 of this embodiment may include a video (e.g., television) conference system for users at a plurality of locations to perform a video conference. The PCs 1 transmit and receive audio data and moving-image data (hereinafter referred to as media data) to and from one another to share the voice and images at the plurality of locations. The sharing of the voice and images allows a video conference to be achieved. Specifically, a PC 1 acquires image data from a camera 33 present in the same location. For example, the image data may include moving image data as an example of media data. The PC 1 encodes the acquired image data to generate encoded data. The PC 1 transmits the generated encoded data to the other PCs 1 in the communication system 100 via a network 8. Furthermore, the PC 1 decodes encoded data received from the other PCs 1. The PC 1 displays images in the other locations on a display 34 on the basis of the decoded data. Thus, the images in the plurality of locations are shared in the communication system 100. Sharing of voice may be performed in similar fashion to the manner in which images are shared. Instead of the PCs 1, dedicated video, audio or multimedia conference terminals or the like for achieving a video, audio or multimedia conference may be used.

As further shown in FIG. 1, each of the PCs 1 include a CPU 10, a ROM 11, a RAM 12, and a hard disk drive (hereinafter referred to as a HDD) 13, and an input/output interface 19. These devices may be mutually connected via a bus 18.

The CPU 10 is configured to control the operations and functionality of PC 1. The ROM 11 stores programs (e.g., computer readable instructions), initial values, etc. for operating the PC 1. The RAM 12 temporarily stores various items of information used in the control programs. The HDD 13 is a computer-readable nonvolatile storage medium that stores various items of information, such as an encoding program for controlling encoding of media data. Instead of the HDD 13, an EEPROM, a memory card, or another storage device may be used.

The input/output interface 19 connects to an audio-input processing unit 21, an audio-output processing unit 22, an image-input processing unit 23, an image-output processing unit 24, an operation-input processing unit 25, and an external communication I/F 26. The audio-input processing unit 21 processes the input of audio data via a microphone 31 that receives audio data as input. The audio-output processing unit 22 controls the operation of a speaker 32 to provide voice output. The image-input processing unit 23 processes the input of image data from a camera 33 that acquires an image. The image-output processing unit 24 controls the operation of the display 34 to display images. The operation-input processing unit 25 processes the input of operation from an operation unit 35, such as a keyboard and a mouse. The external communication I/F 26 connects the PC 1 to the network 8.

Measurement of an available bandwidth will be described. The PC 1 forms encoded media data into packets. The PC 1 transmits and receives the packet data to/from the other PCs 1, and at the same time, measures available bandwidths thereof. The available bandwidth is the volume of data that a computing device such as one of PCs 1 can transmits per unit of time over the network 8. In one example, an available bandwidth may refer to the maximum transmission speed at which a receiving PC 1 can receive data at a particular transmission bit rate from a transmitting PC 1. To compare the available bandwidth and the data transmission bit rate among the PCs 1, the available bandwidth is expressed as the number of bits conveyed (bps).

There are various available bandwidth measuring methods, e.g., analyzing at least one packet sent or received between a client and a server. This embodiment uses an available bandwidth measuring method described in the following document by way of example (M. L. T. Cao, G. Hasegawa, and M. Murata, "Available bandwidth measurement via TCP connection" in Proceedings of IFIP/IEEE MMNS 2004 E2EMON Workshop, October 2004, which is incorporated by reference).

In the measuring method described in the above document, a plurality of packets are transmitted in sequence, with the transmission intervals gradually increased or decreased. For example, if a plurality of packets is transmitted, with the transmission intervals gradually increased, the intervals at which the receiving PC 1 receives the individual packets (reception intervals) become longer than the transmission intervals of the transmitting PC 1 when the transmission bit rate is greater than the available bandwidth. However, if the transmission intervals increase, and the transmission bit rate decreases to the available bandwidth or less, the reception intervals and the transmission intervals become equal. Thus, a data transmission bit rate at the point where the value of "reception intervals—transmission intervals" (e.g., a value resulting from the number of transmission intervals subtracted from the number of reception intervals) changes can be measured as an available bandwidth. For example, if a plurality of packets is transmitted with the transmission intervals gradually decreased, a data transmission bit rate at the point where the value of "reception intervals—transmission intervals" becomes greater than zero can be measured as the available bandwidth. Using the measuring method described in the above document allows available bandwidths to be measured while transmitting and receiving image or audio data among the plurality of PCs 1 without using a dedicated packet etc. for measuring available bandwidths.

Encoding conditions for media data will be described. If data is transmitted at a transmission bit rate exceeding an available bandwidth, packet losses, transmission delay due to congestion, etc. may occur. On the other hand, if the PCs 1 excessively decrease their transmission bit rates, the available bandwidths cannot be fully used, which is inefficient. Accordingly, it is preferable that the PCs 1 control the data transmission bit rates according to measured available bandwidths. The transmission bit rates of the PCs 1 of this embodiment are adjusted to suitable values by changing the setting of media data encoding conditions according to measured available bandwidths.

The encoding conditions include a frame rate, a resolution, the number of colors, and the configuration of GOP (group of pictures). Decreasing at least one of the frame rate, the resolution, and the number of colors may result in a decrease of the transmission bit rate. The GOP refers to a group of frames in the case where image compression encoding is performed on the basis of H.264 standard or the like. The image compression encoding includes intra-frame encoding and inter-frame encoding. The intra-frame encoding is encoding performed in image data in one of a continuous plurality of frames input by a camera. I-picture (intra-coded picture), which is encoded data generated by intra-frame coding, can be separately decoded with reference to the other pictures. On the other hand, in inter-frame coding of data in continuous frames, data in a first frame different from data in a second frame to be encoded are used to calculate prediction error, and the calculated prediction error is encoded. The encoded data generated by the inter-frame encoding includes P-picture (predictive-coded picture) and B-picture (Bi-directionally predictive-coded picture). To decode the P-picture and the B-picture, data in another frame is required. However, the volume of data of the P-picture and the B-picture is generally smaller than that of I-pictures that can be decoded independently. The GOP described above refers to a group of frames from one I-picture to the next I-picture. For example, increasing the proportion of the P-picture and B-picture in the GOP and using a sequentially or temporally nearer/closer frame as a frame referred to in the inter-frame encoding decreases the transmission bit rate.

Figure 2:
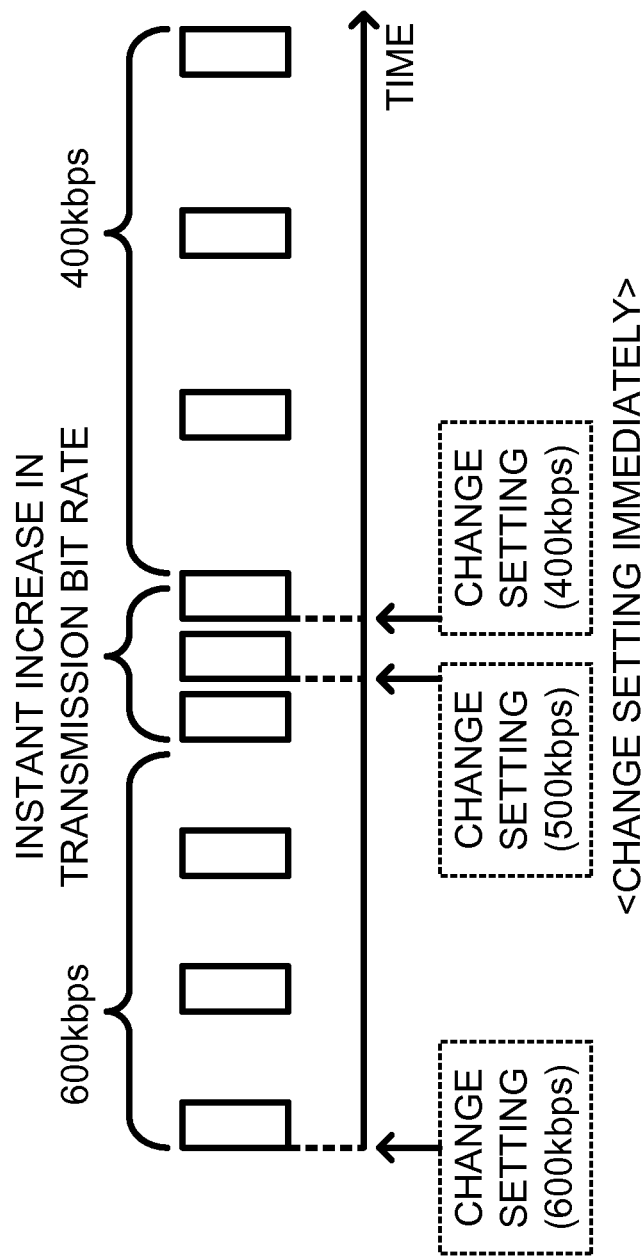
FIG. 2 illustrates an example of adjustment of a transmission bit rate by changing the frame rate.
Figure 3:
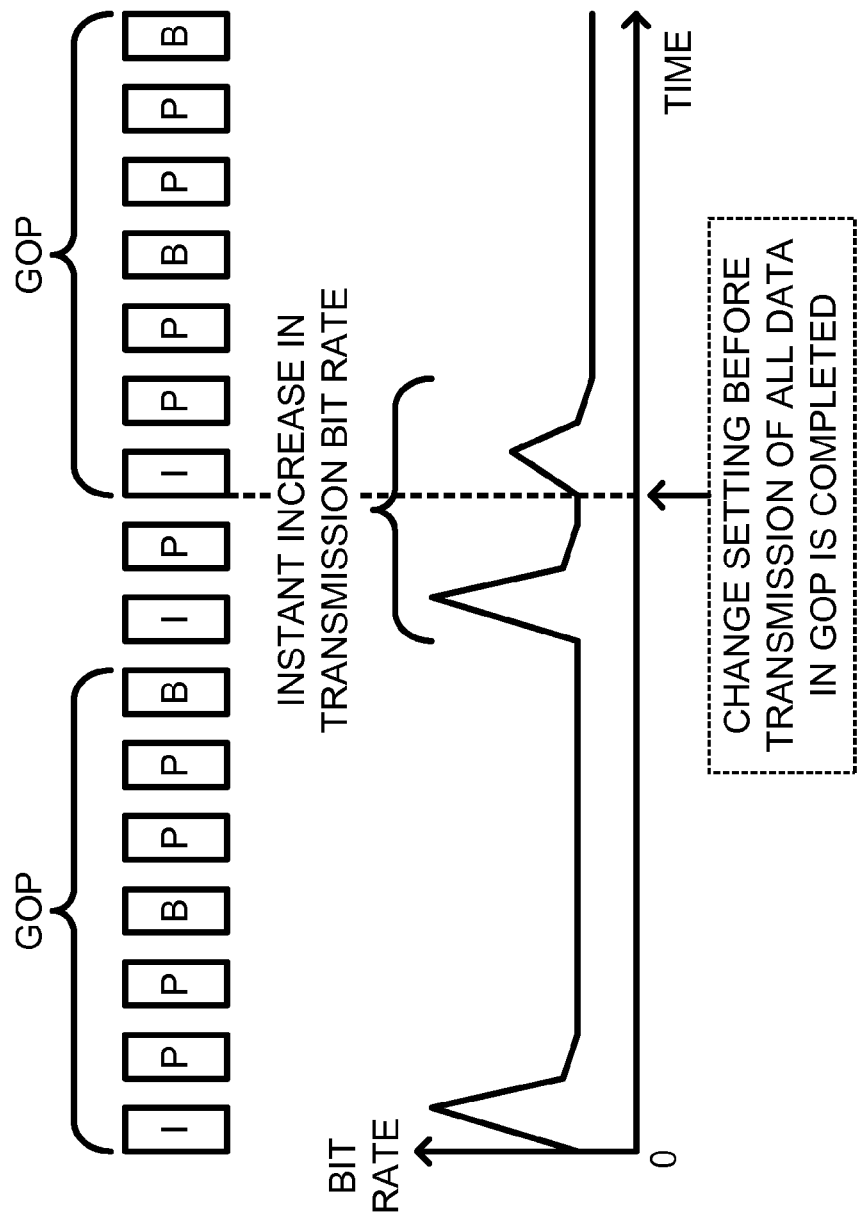
FIG. 3 illustrates an example of adjustment of the transmission bit rate of encoded data with a GOP configuration.

Referring to FIGS. 2 and 3, problems in changing the setting of encoding conditions will be described. In the example shown in FIG. 2, processing for decreasing the frame rate, which is one of the encoding conditions, step by step is performed to decrease the transmission bit rate. As a result, the transmission bit rate may be reduced from 600 kbps to 400 kbps. However, in the example shown in FIG. 2, after the target value of the transmission bit rate is set at 500 kbps, the target value is immediately changed to 400 kbps, and thus, the frame rate is continuously changed. Furthermore, frame data is transmitted every time the frame rate is changed. This results in an instant increase in the transmission bit rate.

In the example shown in FIG. 3, the setting of the configuration of GOP, which is one of the encoding conditions, is changed to decrease the transmission bit rate. As described above, the volume of data of the I-picture is larger than that of the P-picture and B-picture. Thus, with the GOP configuration, a transmission bit rate at the point where an I-picture is transmitted increases. Thus, as shown in FIG. 3, changing the setting of the GOP configuration before transmission of all data in the GOP is completed such that a new GOP transmission is started from an I-picture may instantly increase the transmission bit rate. Thus, to adjust the setting of the GOP configuration without instantly increasing the transmission bit rate, setting changes may be performed after at least a fixed time interval from a previous change of the setting of encoding conditions.

To transmit data at a suitable transmission bit rate according to the available bandwidth, it is preferable to set the encoding conditions immediately after the measurement result of the available bandwidth is acquired, since the available bandwidth may constantly or immediately change. However, as noted herein, changing the settings immediately after the setting of encoding conditions is changed instantly increases the transmission bit rate. Furthermore, the timing at which the measurement of an available bandwidth is completed changes due to various factors, such as the available bandwidth to be measured and a network delay (for example, a delay due to communication path, physical distance, etc.). Accordingly, it is also difficult to acquire the measurement result of an available bandwidth at a fixed timing. Specifically, in the case where the setting of encoding conditions is determined depending on available bandwidths among the plurality of PCs 1, it may be difficult to acquire all the measurement results at fixed timing due to the number of available bandwidths to be measured.

Accordingly, the timing at which the setting of encoding conditions is changed may be set to a time at which no instant increase in transmission bit rate occurs and at which the latest possible measurement result of an available bandwidth can be acquired. The PCs 1 according to this embodiment may estimate the time at which the measurement results of available bandwidths are acquired. Accordingly, the PCs 1 can change the setting of encoding conditions at suitable timing according to the estimated time and a scheduled time for changing the setting of encoding conditions. The details of the processing will be described herein below.

Referring to FIGS. 4 to 9, various processes that may be executed by the PCs 1 will be described. Connection processing, disconnection processing, encoding-setting changing processing, and encoding processing are executed by the CPU 10 of the PC 1 in accordance with an encoding program stored in the HDD 13. The program may be stored in a non-transitory readable storage medium such as a compact disk, a digital versatile disk, a flash memory and the like. The PC 1 can load the storage medium. The CPU 10 can execute the connection processing, disconnection processing, encoding-setting changing processing, and encoding processing in parallel. The processes exemplified in FIGS. 4 to 9 may be used to adjust the transmission bit rate by changing the frame rate, in which the volumes of data in the individual frames are substantially the same.

Figure 4:
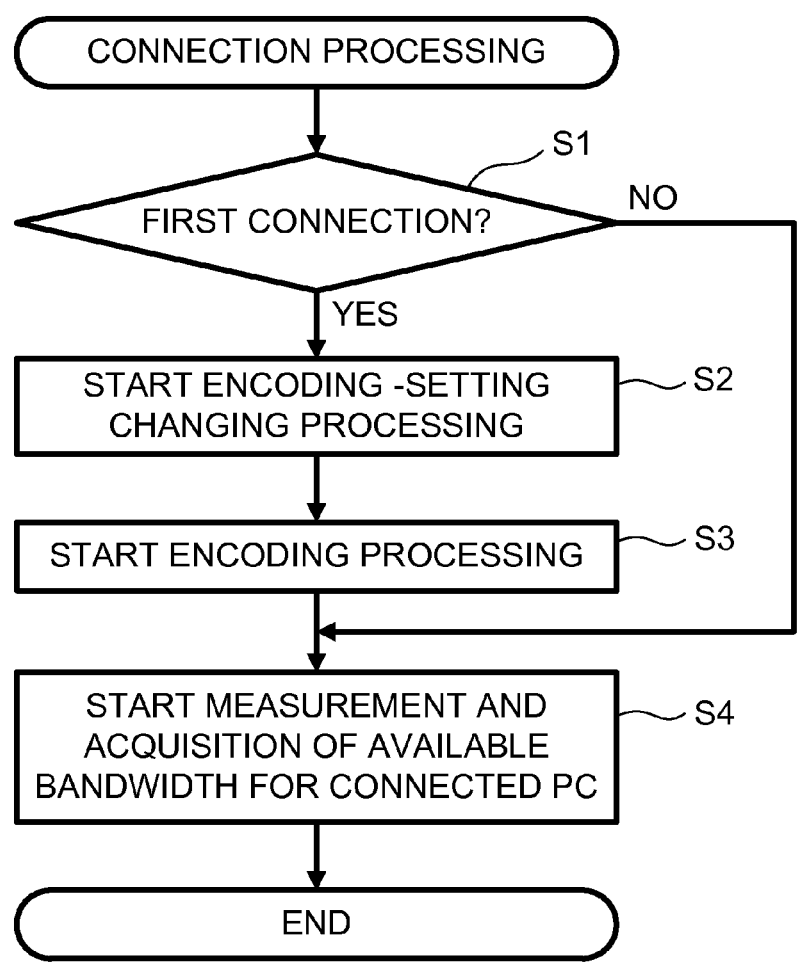
FIG. 4 is a flowchart illustrating an example connection process.

Referring to FIG. 4, connection processing will be described. When an instruction to execute communication connection with another PC 1 in the communication system 100 is input from the operation unit 35 or the like, the CPU 10 starts connection processing. First, the CPU 10 determines whether it is the first connection with the other PC 1 (S1). If it is determined to be the first connection (S1: YES), the CPU 10 starts an encoding-setting changing process (see, e.g., FIG. 6) (S2) and also starts an encoding process (see, e.g., FIG. 9) (S3). As a result, a audio, video and/or multimedia conference is started. Next, a process for measuring and acquiring an available bandwidth for the connected PC 1 is started (S4), and the connection process is finished. If it is determined that the connection is not the first connection with the other PC 1 (S1: NO), the CPU 10 skips to the processing of S4 because the encoding-setting changing processing and the encoding processing have already been started and finishes the connection processing.

Figure 5:
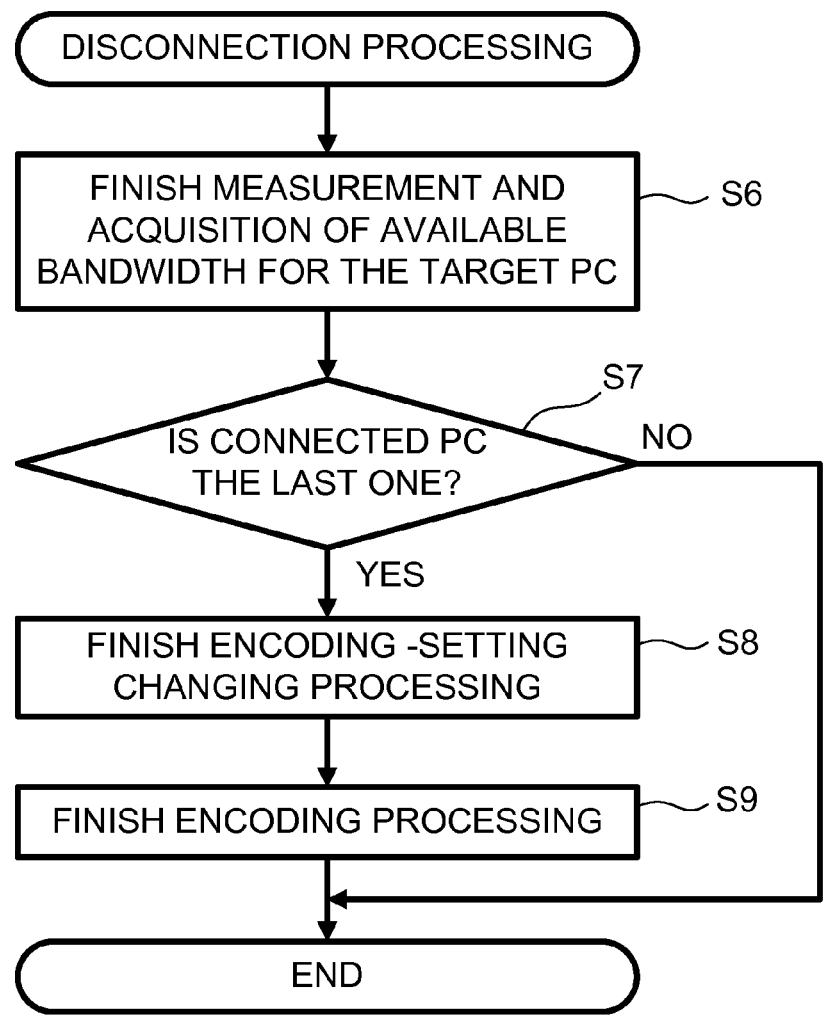
FIG. 5 is a flowchart illustrating an example disconnection process.

Referring to FIG. 5, disconnection processing will be described. When an instruction to disconnect a communication connection with another PC 1 is input from the operation unit 35 or the other PC 1, the CPU 10 starts disconnection processing. For example, the CPU 10 finishes measurement and acquisition of an available bandwidth for the target PC 1 (S6). Next, the CPU 10 determines whether the target PC 1 is only one PC 1 connected at that time (e.g., whether the PC 1 is the last connected PC 1) (S7). If there is another connected PC 1 (S7: NO), the disconnection processing is finished. If it is the last connection (S7: YES), the CPU 10 finishes the encoding-setting changing process, i.e., a termination process to finish the encoding-setting changing process is performed (see FIG. 6) (S8) and thereafter finishes the encoding process (see FIG. 9) (S9), and the disconnection process is finished.

Figure 6:
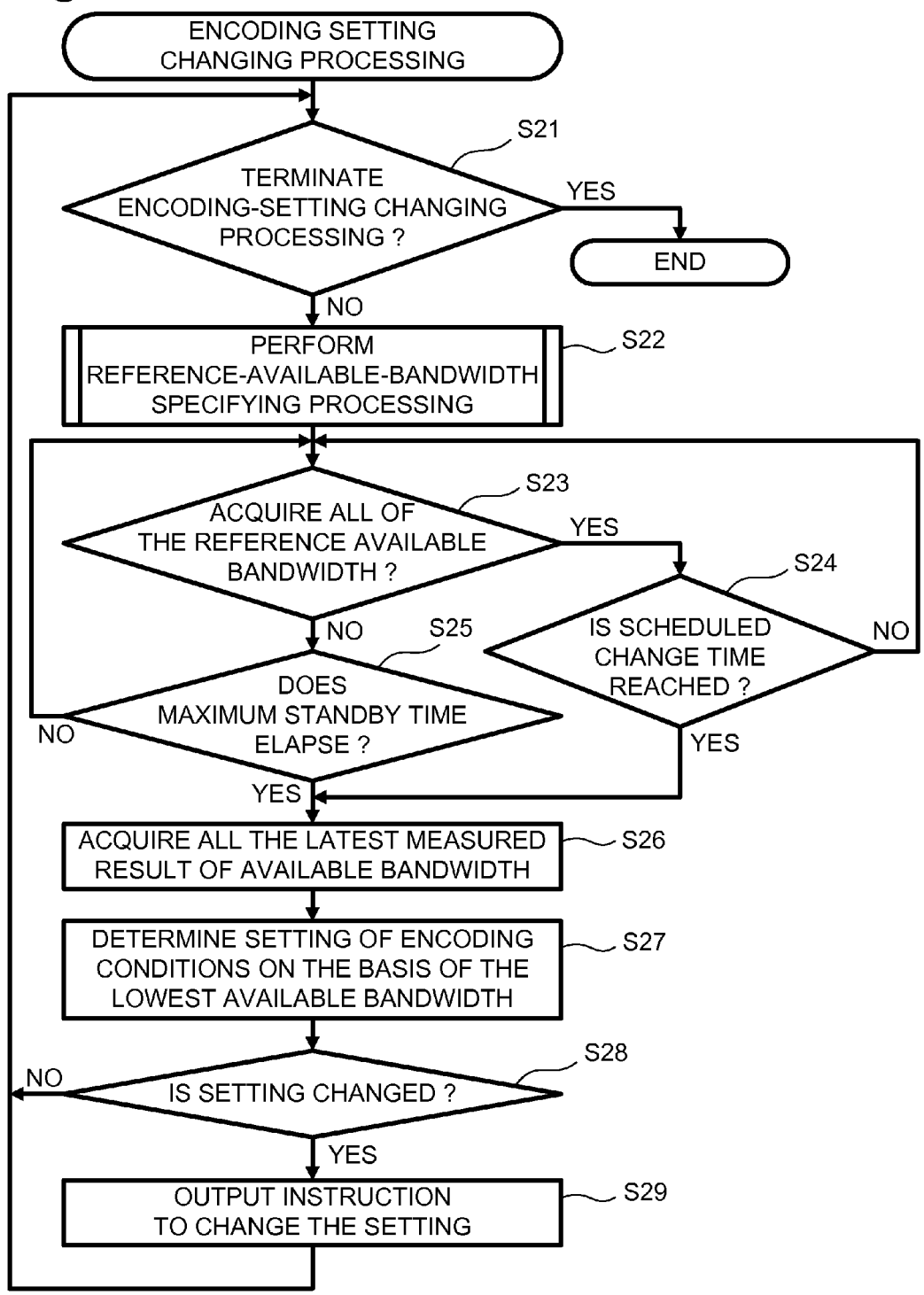
FIG. 6 is a flowchart illustrating an example encoding-setting changing process.
Figure 7:
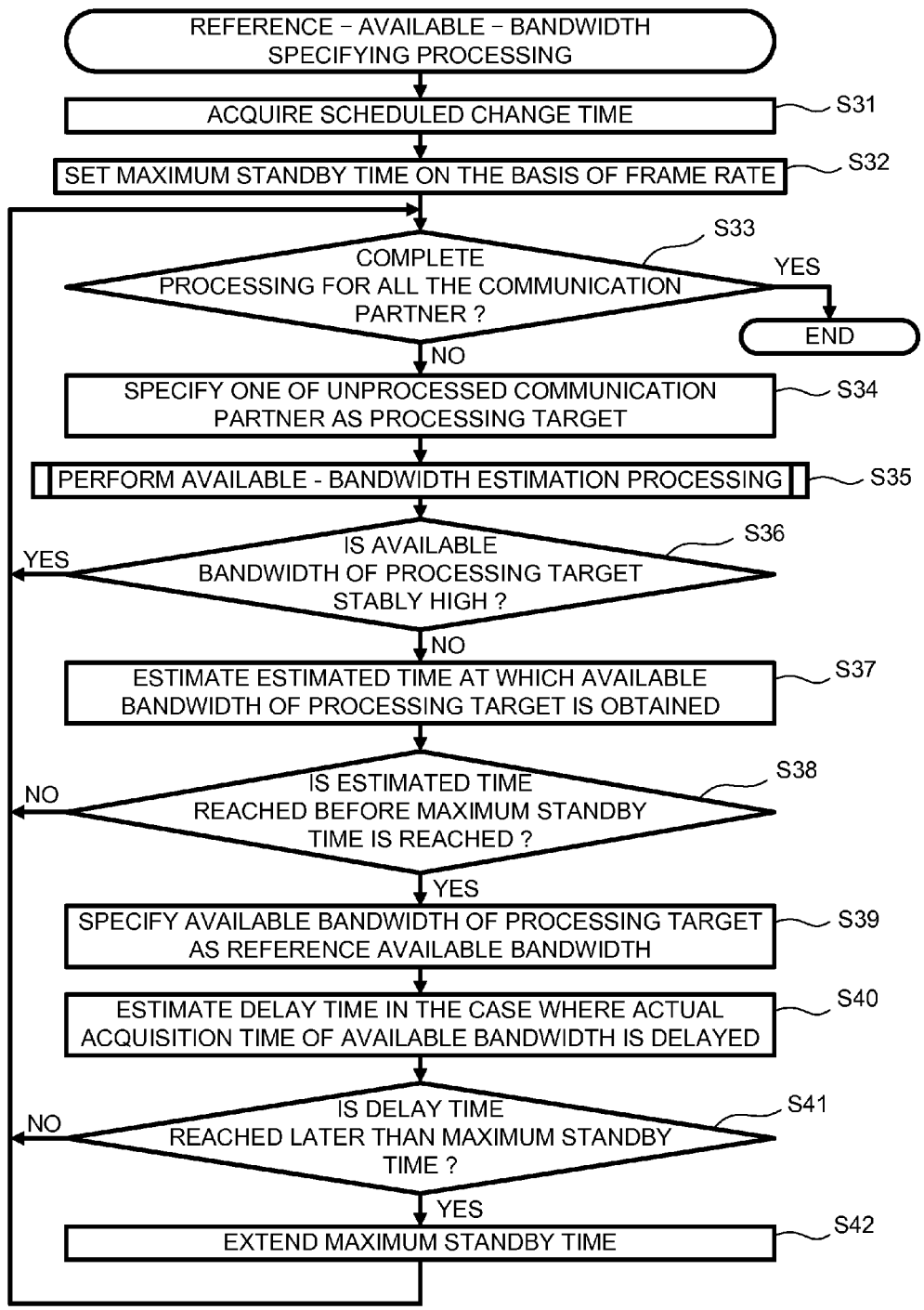
FIG. 7 is a flowchart illustrating an example reference-available-bandwidth specifying process in the encoding-setting changing process.
Figure 8:
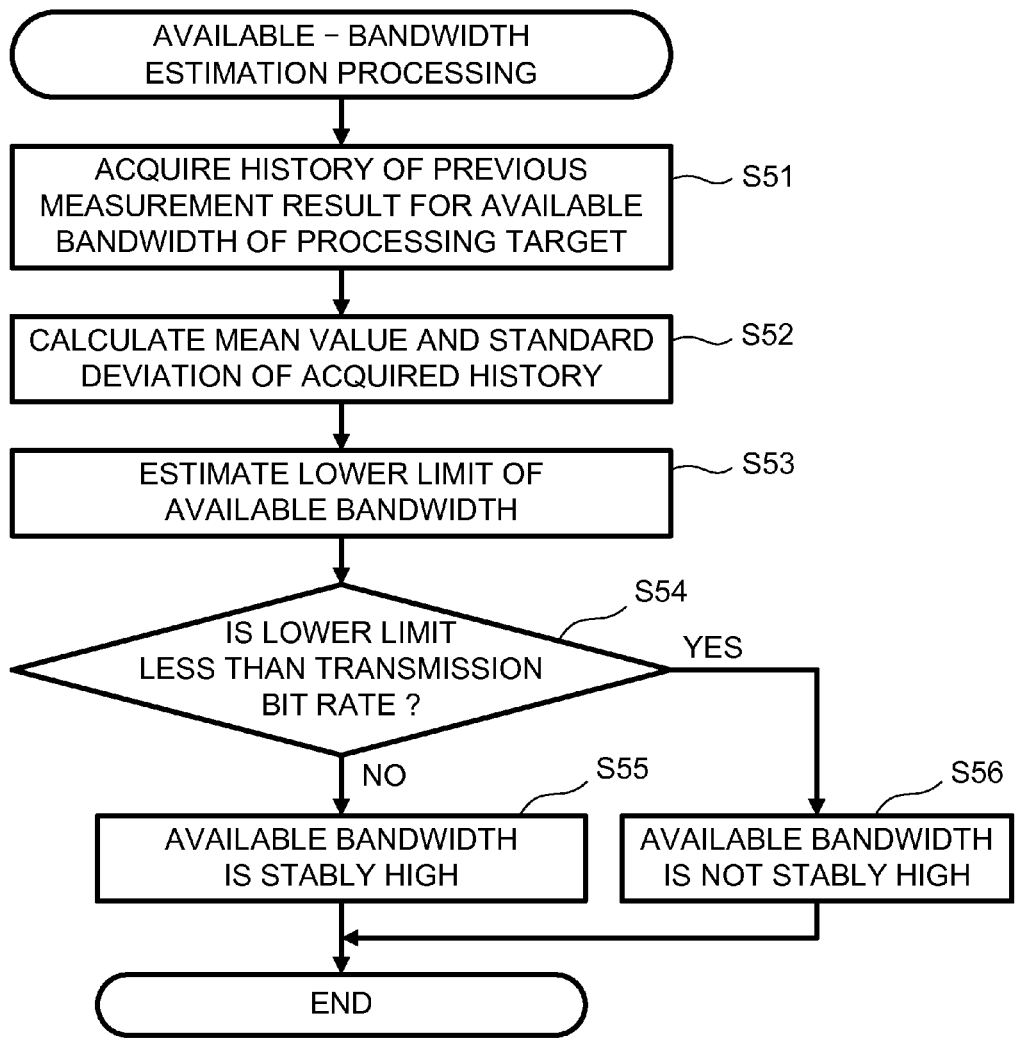
FIG. 8 is a flowchart illustrating an example available-bandwidth estimation process in a reference-available-bandwidth specifying process.

Referring to FIGS. 6 to 8, encoding-setting changing processing will be described. As described above, the encoding-setting changing processing is started in the connection process (see S2 in FIG. 4). First, the CPU 10 determines whether a process for finishing the encoding-setting changing processing has been executed (S21). If termination processing has been performed in S8 of the disconnection processing (see FIG. 5) (S21: YES), the processing is finished. If termination processing has not been performed (S21: NO), reference-available-bandwidth specifying processing is performed (S22). The reference available bandwidth is an available bandwidth that is referred to when the setting of encoding conditions is changed at a following point in time. In the reference-available-bandwidth specifying processing, a reference available bandwidth is specified in accordance with, for example, a scheduled time at which the setting of encoding conditions is changed or is to be changed.

As shown in FIG. 7, after the reference-available-bandwidth specifying processing is started, the CPU 10 acquires a scheduled change time (S31). The scheduled change time is a scheduled time at which the setting of encoding conditions is to be changed. The scheduled change time is set such that the transmission bit rate does not increase instantly when the setting is changed. In this embodiment, the CPU 10 acquires/determines the point where a predetermined time (for example, one second) has passed from the last setting change as a scheduled change time, thereby preventing an increase in transmission bit rate.

The CPU 10 sets a maximum standby time (S32). The maximum standby time is the maximum amount of time during which CPU 10 may wait for a change of the setting of encoding conditions after a scheduled change time is reached. If the CPU 10 presumes that the measurement result of an available bandwidth can be acquired directly after the scheduled change time is reached, the CPU 10 waits for a change of the setting, which is described later in additional detail. This allows the CPU 10 to change the setting of encoding conditions with reference to the latest possible measurement result of an available bandwidth. However, an excessively long standby time may cause changes in available bandwidth, which may hinder quick changing of the setting of encoding conditions even if the setting should be changed. Accordingly, only when the CPU 10 presumes that the measurement result of the available bandwidth can be acquired within the maximum standby time, the CPU 10 waits for a change of the setting. In this embodiment, the CPU 10 calculates and sets the maximum standby time using the following Eq. 1. Here, "1/frame rate" is a frame transmission interval.

Maximum standby time=(1/frame rate)×a ("a" is a positive coefficient)     (Eq. 1)

Next, the CPU 10 performs processing for determining whether to specify the individual available bandwidths of connected PCs 1 (communications partners) as reference available bandwidths. First, the CPU 10 determines whether processing for all of the communication partner PCs 1 has been completed (S33). If the processing has not been completed (S33: NO), the CPU 10 specifies one of communication partner PCs 1 for which processing has not been completed as a processing target (S34). The CPU 10 performs available-bandwidth estimation processing using an available bandwidth for the specified PC 1 (S35). In the available-bandwidth estimation processing, it is estimated whether the available bandwidth of the processing target can be the lowest value of the available bandwidths of all the processing targets, that is, the lowest value as compared with the available bandwidths of all the processing targets.

As shown in FIG. 8, in the available-bandwidth estimation processing, the CPU 10 acquires the history of the previous measurement results for the available bandwidth of the processing target (S51). The CPU 10 calculates the mean value and the standard deviation of the acquired history (S52). The mean value is not limited to an arithmetic mean. For example, a weighted mean, a median value, or a mode may be used as the mean value. The CPU 10 estimates the lower limit of the available bandwidth of the next processing target from the calculated mean and standard deviation (S53). That is, the CPU 10 estimates a measured value in the case where the available bandwidth of the processing target changes to the lower limit. In this embodiment, the lower limit of the available bandwidth of the processing target is estimated using the standard deviation. Assuming that the available bandwidth of the processing target has a normal distribution, the CPU 10 estimates the lower limit using the following Eq. 2.

Lower limit=mean−1.96×(standard deviation/the square root of the number of histories)     (Eq. 2)

By using Eq. 2, the probability that an actual measurement is below the estimated lower limit (the probability of failure in lower limit estimation) is 5%. The coefficient "1.96" in Eq. 2 may be changed. For example, if the coefficient is 2.58, the probability that the actual measurement is below the estimated lower limit is 1%.

The CPU 10 determines whether the estimated lower limit is less than the transmission bit rate of encoded data at that point in time (S54). Thus, the CPU 10 estimates whether the available bandwidth of the processing target may be the lowest value of the available bandwidths of all of the other communication partners based on the fact that the transmission bit rate at that point in time is equal to the lowest available bandwidth of all of the available bandwidths referred to when the setting of encoding conditions was changed during a previous or most recent time (additional details are described herein). Accordingly, an estimated lower limit, if it is less than a transmission bit rate at that point in time, is also less than the lowest available bandwidth of available bandwidths referred to at the last setting change. In this case, the available bandwidth of the next processing target, if changed to an even lower value, may become the lowest of the available bandwidths of the other communication partners. Accordingly, by determining whether the estimated lower limit is less than the transmission bit rate, it can be estimated whether the available bandwidth of the processing target is the lowest of the available bandwidths of the other communication partners.

If it is determined that the estimated lower limit is greater than or equal to the transmission bit rate (S54: NO), the CPU 10 determines that the available bandwidth of the processing target is stably high (S55). If the estimated lower limit is lower than the transmission bit rate (S54: YES), the CPU 10 determines that the available bandwidth of the processing target is not stably high, that is, that the available bandwidth is the lowest value of the available bandwidths of the other communication partners (S56). The processing is finished and returns to the reference-available-bandwidth specifying processing.

Referring back to FIG. 7, upon completion of the available-bandwidth estimation processing (S35), it is determined whether the available bandwidth of the processing target is stably high (S36). If it is determined that the available bandwidth of the processing target is stably high (S36: YES), there is a low possibility that the encoding conditions are set based on the available bandwidth of the processing target. Accordingly, the available bandwidth of the processing target is not specified or set as a reference available bandwidth, and the processing returns to S33.

If it is determined that the available bandwidth of the processing target is not stably high (S36: NO), there is a possibility that the available bandwidth of the processing target is used as a reference for setting encoding conditions. Accordingly, it may be desirable to set the next encoding conditions for the available bandwidth of the processing target with reference to the latest possible measurement result. Accordingly, the CPU 10 determines whether to specify the available bandwidth of the processing target as a reference available bandwidth.

Specifically, the CPU 10 estimates a time at which the measurement result of the available bandwidth of the processing target is acquired (hereinafter referred to as estimated time) (S37). The estimated time is estimated using at least one network property. The network property may include a network delay, a measured available bandwidth, the number of packets used for measuring an available bandwidth, and the volume of data in a packet used for measuring an available bandwidth and the like. However, the estimated time may be estimated without the network properties. For example, the estimated time may be calculated by adding the mean of times required for past measurements to the time at which measurement is started. Next, the CPU 10 determines whether the estimated time will be reached before the maximum standby time is reached (S38). If the estimated time will not be reached before the maximum standby time is reached (S38: NO), the available bandwidth of the processing target is not specified as a reference available bandwidth, and the processing returns to S33. If, on the other hand, the estimated time will be reached before the maximum standby time is reached (S38: YES), the CPU 10 specifies the available bandwidth of the processing target as a reference available bandwidth (S39). Here, the estimated time being reached before the maximum standby time is reached may refer to a condition in which the estimated time is reached after a scheduled change time is reached and before the maximum standby time has elapsed.

Next, the CPU 10 estimates a delay time in the event the actual acquisition time of the available bandwidth of the processing target is delayed from the estimated time (S40). Preferably, the delay time is estimated using one or more past acquisition times for acquiring the available bandwidth of the processing target and the history of the estimated time. The CPU 10 of this embodiment acquires the history of the past estimated times and acquisition times. The CPU 10 calculates the mean and a standard deviation of a value, obtained by subtracting the estimated time from the acquisition time, on the basis of the acquired history. The delay time is estimated using the calculated mean and standard deviation with the following Eq. 3. However, a method for estimating a delay time is not limited thereto. For example, the delay time may be obtained by adding the maximum time by which the acquisition time is delayed from the estimated time to the time estimated in S37.

$$\text{Delay time} = \text{estimated time} + \text{mean} + 1.96 \times (\text{standard deviation}/\text{the square root of the number of histories}) \quad \text{(Eq. 3)}$$

The CPU 10 determines whether the estimated delay time will be reached later than the maximum standby time (S41). If the estimated delay time is before the maximum standby time (S41: NO), the processing returns to S33. If the delay time is later than the maximum standby time (S41: YES), the maximum actual standby time is extended to the estimated delay time (S42), and the processing returns to S33. This allows the CPU 10 to increase the probability of setting encoding conditions with reference to the specified reference available bandwidth. After the processing of S34 to S42 is performed on all the communication partners (S33: YES), the processing returns to the encoding setting processing.

Referring back to FIG. 6, when the reference-available-bandwidth specifying processing (S22) is finished, the CPU 10 determines whether all of the specified reference available bandwidths have been acquired (S23). If all of the reference available bandwidths have been acquired (including a case where no reference available bandwidth is specified) (S23: YES), the CPU 10 determines whether the scheduled change time has already been reached (S24). If the scheduled change time has not yet been reached (S24: NO), the processing returns to S23. If all of reference available bandwidths have been acquired (S23: YES), and the scheduled change time has been reached (S24: YES), the processing moves to S26. If all of reference available bandwidths have not yet been acquired (S23: NO), the CPU 10 determines whether the maximum standby time has elapsed (S25). If the maximum standby time has not elapsed (S25: NO), the processing returns to the determination in S23. If the maximum standby time has elapsed (S25: YES), the processing moves to S26 irrespective of whether all of the reference available bandwidths have been acquired.

Next, the process of determining and changing the setting of encoding conditions is performed. First, the CPU 10 acquires all of the latest measurement results of the available bandwidths of the individual communication partners (S26). The latest measurement results have been acquired as the reference available bandwidths. The setting of encoding conditions is determined based on reference available bandwidths (e.g., the measured value of the lowest available bandwidth). For example, the process may determine that the transmission bit rate, an example of the setting of encoding conditions, is to be set to the measured value of the lowest available bandwidth of the acquired measurement results (S27). The CPU 10 determines whether the setting (e.g., the measured value of the lowest available bandwidth) represents a change from the last setting (S28). If the setting does not represent a change (S28: NO), the processing returns to the determination in S21. If the setting does represent a change (S28: YES), the CPU 10 outputs an instruction to the RAM 12 to change the setting of encoding conditions to the determined setting (e.g., the measured value of the lowest available bandwidth of the acquired measurement results)(S29), and the processing returns to the determination of S21.

Figure 9:
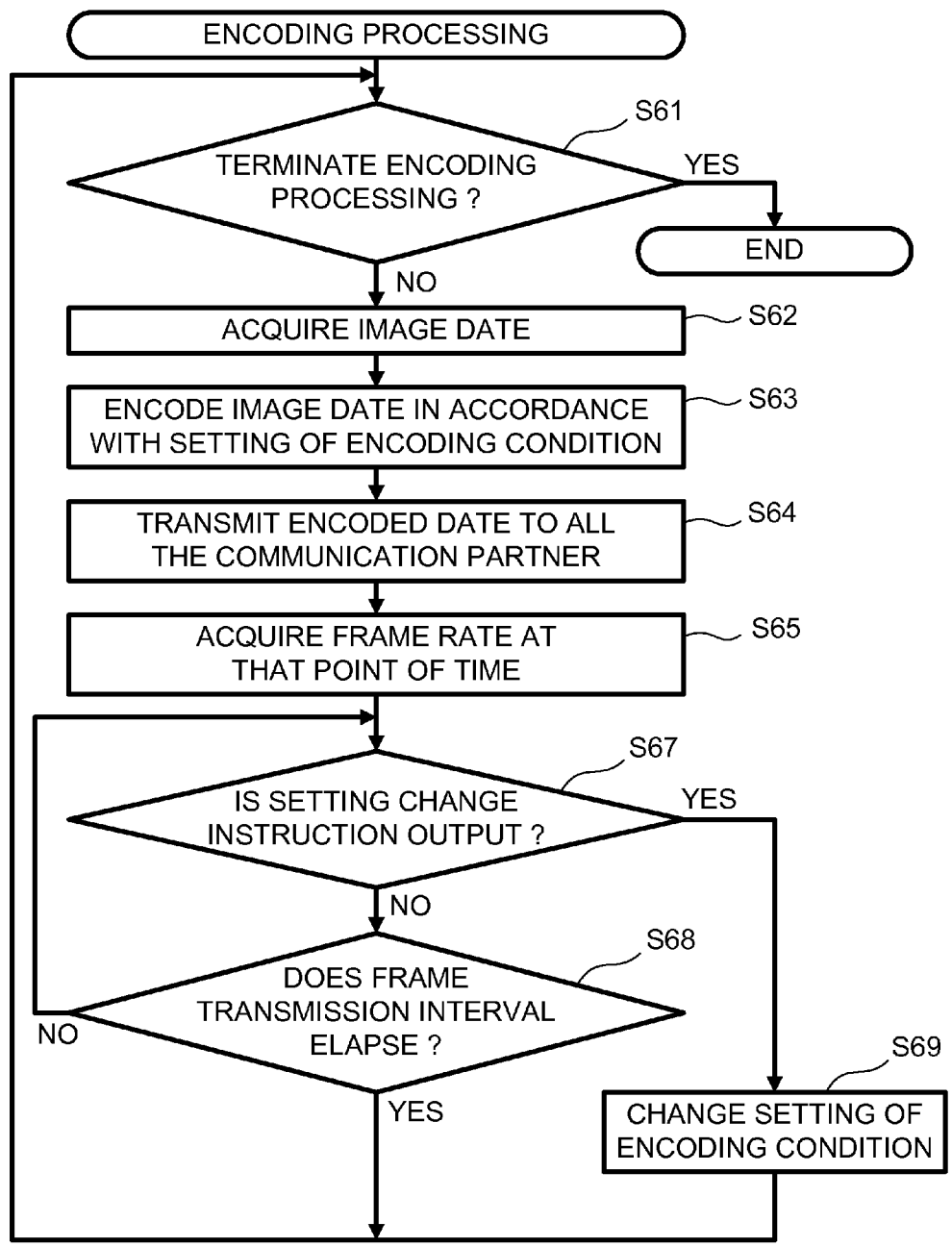
FIG. 9 is a flowchart illustrating an example encoding process.

Referring to FIG. 9, encoding processing will be described. As described above, the encoding processing is started in the connection process (see S3 in FIG. 4). First, the CPU 10 determines whether the process of terminating the encoding process has been performed (S61). If termination processing has not been performed in S9 of the disconnection process (see FIG. 5) (S61: NO), the CPU 10 acquires image data from the camera 33 (S62). The CPU 10 encodes the acquired image data in accordance with the setting of encoding conditions at that point in time (S63). The CPU 10 then transmits the encoded data to all of the communication partner PCs 1 (S64). Next, the CPU 10 acquires a frame rate set at that point in time (S65).

The CPU 10 determines whether a setting change instruction has been output in S29 of the encoding-setting changing process (see FIG. 6) (S67). If a setting change instruction has not been output (e.g., to the RAM) (S67: NO), the CPU 10 determines whether a frame transmission interval (1/frame rate) has elapsed (S68). After the transmission interval has elapsed (S68: YES), the process returns to the determination in S61. If the transmission interval has not elapsed (S68: NO), the processing returns to the determination in S67. If a setting change instruction has been output (S67: YES), the CPU 10 changes the setting of encoding conditions in accordance with the output setting change instruction (S69), and the processing returns to the determination in S61. When the process of terminating the encoding processing is performed (S61: YES), the processing is finished.

As described above, the PC 1 of this embodiment acquires a scheduled change time that is a scheduled time at which the setting of encoding conditions is to be changed. The PC 1 further estimates the timing at which the measurement result of an available bandwidth is or will be acquired. The PC 1 determines encoding-condition-setting change timing on the basis of the scheduled change time and the estimated time and may change the timing at the determined timing. Thus, the PC 1 can change the setting of encoding conditions at suitable timing according to the acquisition state of the measurement result of an available bandwidth.

If the PC 1 estimates that the measurement result of an available bandwidth will be acquired within the set maximum standby time, the PC 1 can wait for a change of the setting of encoding conditions even after the scheduled change time has been reached. By waiting for a change of the setting, the PC 1 can change the setting with reference to the latest or more recent available bandwidth measurement results acquired after the scheduled change time is reached.

If the reference-available-bandwidth acquisition time is delayed from the estimated time, the PC 1 may change the setting of encoding conditions when the maximum standby time has elapsed without a reference available bandwidth being acquired. This can therefore prevent communication from being performed, with encoding conditions remaining unchanged for a long period of time. Furthermore, if all of the reference available bandwidths have been acquired before the maximum standby time elapses, the PC 1 changes the setting at the point where all of the reference available bandwidths are acquired. As such, it might not be necessary to wait the maximum standby time; instead, setting changes may be made once all of the reference available bandwidths have been acquired. Thus, the PC 1 may adjust the transmission bit rate to a suitable value more quickly depending on the changing available bandwidth.

The available bandwidth changes with the passage of time. However, in the case where the PC 1 has a plurality of communication partners, even if the available bandwidth of one communication partner has become low, the setting of encoding conditions is not influenced, provided that the available bandwidth of that one communication partner does not become lower than the available bandwidths of the other communication partners. If the PC 1 estimates that the available bandwidth of one communication partner will not likely become the lowest value of the available bandwidths of the other communication partners, the PC 1 does not specify the available bandwidth of the one communication partner as the reference available bandwidth. When the PC 1 does not specify the available bandwidth of the one communication partner as the reference available bandwidth, the steps from S37 to S42 are not performed (FIG. 7). Thus, a time to perform the reference-available-bandwidth specifying processing can shorten.

If the PC 1 determines that a reference-available-bandwidth acquisition time may be delayed to a time after a maximum-standby-time elapsed time, the PC 1 extends the maximum standby time. Thus, the PC 1 can increase the possibility of referring to the reference available bandwidth and can thus set more suitable encoding conditions. Furthermore, the PC 1 can set a suitable maximum standby time according to the frame transmission interval.

In the above embodiment, the PC 1 is an example of "encoding apparatus" and "communication apparatus" of the present disclosure. The CPU 10 is an example of "processor". The CPU 10 that acquires available bandwidths for the individual communication partners in S4 of FIG. 4 functions as "available-bandwidth acquisition unit". The CPU 10 that estimates the time at which the available bandwidth is acquired in S37 of FIG. 7 functions as "estimation unit". The CPU 10 that encodes media data in S63 of FIG. 9 functions as "encoding unit". The CPU 10 that acquires a scheduled change time in S31 of FIG. 7 functions as "scheduled-change-time acquisition unit". The CPU 10 that determines the timing at which the setting of encoding conditions is changed in S22 to S25 of FIG. 6 functions as "change-timing determination unit". The CPU 10 that changes the setting of encoding conditions in S26 to S29 of FIG. 6 and in S69 of FIG. 9 functions as "setting changing unit".

The CPU 10 that sets the maximum standby time in S32 of FIG. 7 functions as "standby-time setting unit". The CPU 10 that determines whether at least one of the estimated times is included in the maximum standby time in S38 of FIG. 7 functions as "first determination unit". The CPU 10 that specifies a reference available bandwidth in S39 of FIG. 7 functions as "specifying unit". The CPU 10 that estimates whether the available bandwidth of the processing target is the lowest value of the available bandwidths of the other communication partners functions as "bandwidth estimation unit". The CPU 10 that estimates a delay time in S40 of FIG. 7 functions as "delay-time estimation unit". The CPU 10 that determines whether the delay time is later than the time at which the maximum standby time has elapsed in S41 of FIG. 7 functions as "second determination unit". The CPU 10 that extends the maximum standby time in S42 of FIG. 7 functions as "extending unit".

The process of acquiring available bandwidths for the individual communication partners in S4 of FIG. 4 corresponds to "bandwidth acquisition step". The process of estimating the time at which the available bandwidth is acquired in S37 of FIG. 7 corresponds to "estimation step". The process of encoding media data in S63 of FIG. 9 corresponds to "encoding step". The process of acquiring a scheduled change time in S31 of FIG. 7 corresponds to "scheduled-change-time acquisition unit". The process of determining the timing at which the setting of encoding conditions is changed in S22 to S25 of FIG. 6 corresponds to "change-timing determination step". The process of changing the setting of encoding conditions in S26 to S29 of FIG. 6 and in S69 of FIG. 9 corresponds to "setting changing step".

Figure 10:
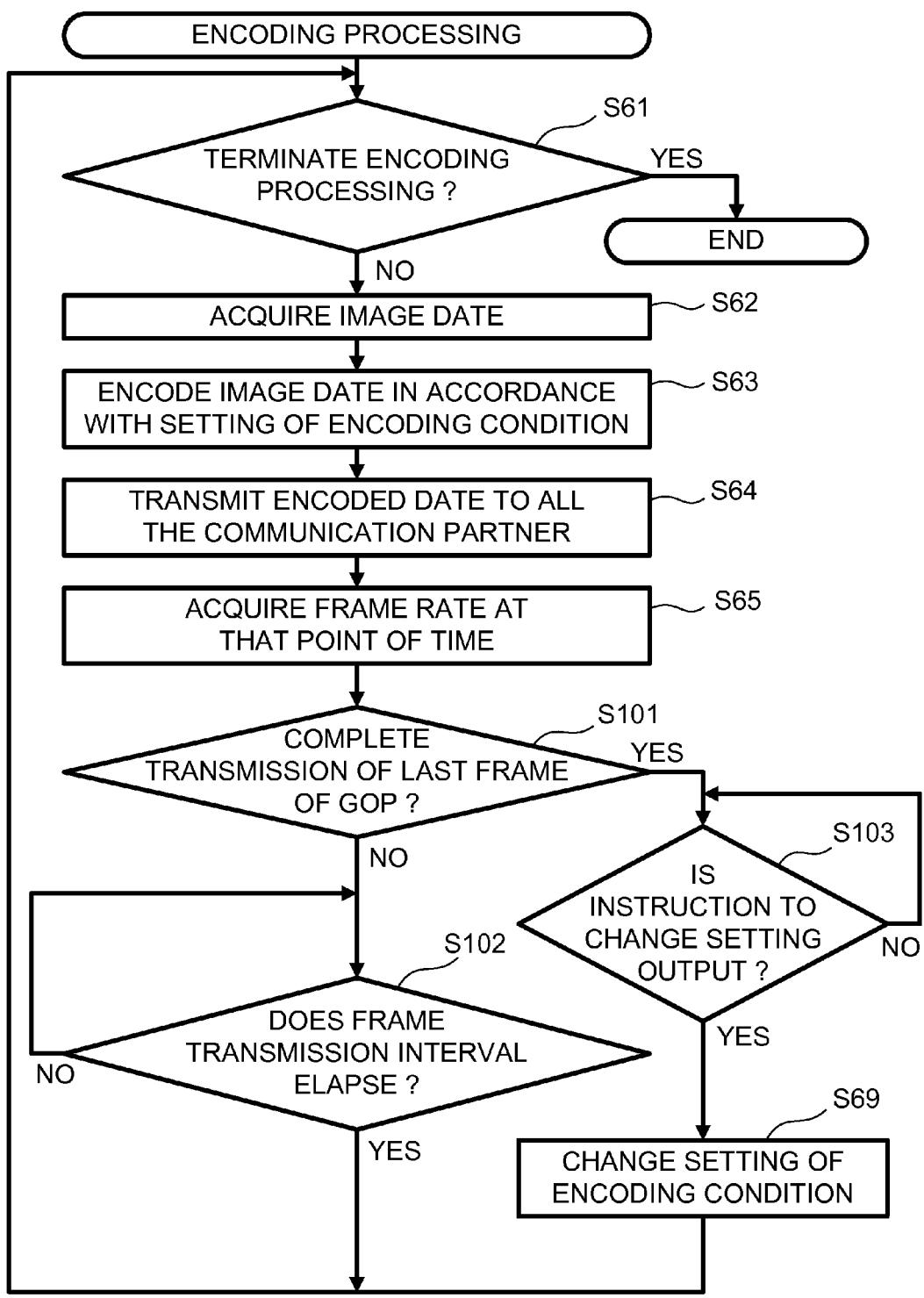
FIG. 10 is a flowchart illustrating another example encoding process.

The present disclosure is not limited to the foregoing embodiment and various modifications can be made. Referring to FIG. 10, processing in the case where encoded data transmitted by the PC 1 has a GOP configuration (see FIG. 3) will be described. In the following modification, only part of the processing differs from that of the PCs 1 of the foregoing embodiment. Accordingly, the same configurations and processing will be given the same reference numerals, and descriptions thereof will be omitted or simplified.

As described above, when the setting of encoding conditions is changed before completion of transmission of all GOP data, and a new GOP is transmitted from an I-picture, the transmission bit rate increases instantly. Accordingly, the scheduled change time acquired in S31 of FIG. 7 may be a periodic I-picture transmission time. In the case of the GOP configuration, while a change of the setting is awaited after the scheduled change time is reached, I-pictures are continuously transmitted to instantly increase the transmission bit rate unless transmission of the next frame (I-picture) is delayed. Furthermore, as shown in FIG. 10, when the process of encoding image data and transmitting the encoded data is completed (S62 to S65), the CPU 10 determines whether transmission of the last frame of the GOP has been completed (S101). If transmission of the last frame has not been completed, and the GOP is halfway through transmission (S101: NO), the processing returns to the determination in S61 at the point where the frame transmission interval has elapsed (S102: YES), and the CPU 10 performs processing of the next frame. If the transmission of the last frame of the GOP has been completed (S101: YES), the CPU 10 waits for transmission of the next frame and a change of the setting of encoding conditions until an instruction to change the setting is output in S29 of FIG. 6 (S103: NO). If a setting change instruction is output (S103: YES), the CPU 10 changes the setting of encoding conditions (S69) and starts transmission of the next GOP. As described above, the present disclosure can also be applied to the case where encoded data to be transmitted has a GOP configuration.

Various modifications can be made to the foregoing embodiment. For example, in the foregoing embodiment, both the process of encoding image data and the process of transmitting and receiving the encoded data are executed by the PC 1. That is, the PC 1 functions as an encoding apparatus and a communication apparatus. Alternatively, the encoding apparatus that performs encoding processing and the communication apparatus that transmits and receives encoded data may be different apparatuses. For example, a PC that functions as a communication apparatus may be connected to a camera with an encoding function that has both an image-acquisition function and an encoding function. Instead of the PC 1, for example, a terminal designed for executing a video, audio or multimedia conference may be used. Alternatively, another device other than the PC 1 may execute the process of measuring an available bandwidth, and the PC 1 may acquire the available bandwidth that the other device measured. In the foregoing embodiment, the process of setting encoding conditions for image data has been described; alternatively, the present disclosure can also be applied to the setting of encoding conditions for another media data, such as audio data.

The PC 1 of the above embodiment determines, as encoding-condition-setting change timing, the earlier one of the point where a scheduled change time has come and all of reference available bandwidths have been acquired and the point where the maximum standby time has elapsed. However, a method for determining the setting change timing is not limited thereto. For example, if the PC 1 determines that an estimated time is reached before the maximum standby time is reached, the point where the maximum standby time has elapsed may be set as the setting change timing. In another example, the latest estimated time among one or a plurality of estimated times, which are reached before the maximum standby time, may be set as the setting change timing. The PC 1 of the above embodiment estimates a delay time, which is an acquisition time in the case where acquisition of the measurement result of an available bandwidth is delayed, and if the estimated delay time is later than the point where the maximum standby time has elapsed, the PC 1 extends the maximum standby time. However, the process of extending the maximum standby time may be omitted. As such, aspects of the present disclosure may be achieved even if the maximum standby time is not set on the basis of the frame rate. For example, the maximum standby time may be a fixed value or may be set in accordance with another parameter.

The PC 1 of the above embodiment uses the mean value and standard deviation of the history of the past measurement results to estimate a measured value (lower limit) in the case where the available bandwidth of a target communication partner changes and the lowest limit thereof is measured. Alternatively, the lower limit may be estimated using another method. For example, the dispersion of previous measurement results or the latest one among previous past measurement result may be used for estimation.

The method for estimating whether the available bandwidth of the processing target can be the lowest value can also be changed. For example, if the mean value of the measurement results of the available bandwidth of the processing target is higher than a transmission bit rate at that point in time by a threshold value, the available bandwidth of the processing target may be estimated not to be the lowest value. If the last measurement result of the available bandwidth of the processing target is higher than a transmission bit rate at that point in time by a threshold value, the available bandwidth of the processing target may be estimated not to be the lowest value. If the PC 1 estimates the lower limit and the upper limit of the available bandwidths of the individual communication partners, and if the lower limit of the available bandwidths of the processing targets is greater than or equal to the upper limit of the available bandwidths of one or more communication partners, the available bandwidth of the processing target may be determined to be stably high. In this case, the upper limit may be obtained using, for example, the following Eq. 4.

$$\text{Upper limit} = \text{mean} + 1.96 \times (\text{standard deviation}/\text{the square root of the number of histories}) \quad \text{(Eq. 4)}$$

The PC 1 may calculate a value to be compared with the estimated lower limit using the mean value of the history of the set values of the past encoding conditions (for example, the set values of the transmission bit rate), dispersion, standard deviation, etc.

What is claimed is:

1. An apparatus comprising:
   a communication interface configured to connect to a communication device via a network; and
   a processor configured to execute computer readable instructions stored on a computer readable storage medium, to provide:
   an available-bandwidth acquisition unit configured to measure an amount of available bandwidth for the communication device;
   an encoding unit configured to encode media data into encoded data to be transmitted to the communication device;
   a scheduled-change-time acquisition unit configured to determine a scheduled change time at which a setting of an encoding condition by the encoding unit is expected to be changed;
   an acquiring determination unit configured to determine whether the amount of available bandwidth has been measured by the available-bandwidth acquisition unit;
   a change-timing determination unit configured to determine a change timing based on the scheduled change time and a determination by the acquiring determination unit, the change timing being:
      the scheduled change time, in a case where the acquiring determination unit determines that the available-bandwidth acquisition unit has measured or will measure the amount of available bandwidth on or before the scheduled change time; and
      a point in time after the scheduled change time is reached and before a timing at which the available-bandwidth acquisition unit measures the amount of available bandwidth such that the setting of the encoding condition is not changed at the scheduled change time, in a case where the acquiring determination unit determines that the available bandwidth will be measured after the scheduled change time; and
   a setting changing unit configured to change the setting of the encoding condition in accordance with the measured amount of available bandwidth when the change timing is reached.

2. The encoding apparatus according to claim 1, wherein the processor is further configured to provide:
   an estimation unit configured to estimate a time at which the available-bandwidth acquisition unit is expected to measure the amount of available bandwidth,
   wherein the change-timing determination unit comprises:
      a standby-time setting unit configured to set a maximum standby time during which a change of the setting of the encoding condition is awaited after the scheduled change time is reached; and
      a first determination unit configured to determine whether the estimated time will be reached before the maximum standby time is reached, and wherein the change-timing determination unit further determines the scheduled change time as the change timing if the first determination unit determines that the estimated time will not be reached before the maximum standby time is reached.

3. The encoding apparatus according to claim 2, wherein the change-timing determination unit comprises:
a standby-time setting unit configured to set a maximum standby time during which a change of the setting of the encoding condition is awaited after the scheduled change time is reached; and
a first determination unit configured to determine whether the estimated time will be reached before the maximum standby time is reached, and
wherein the change-timing determination unit determines a point in time after the scheduled change time is reached and before the maximum standby time has elapsed as the change timing if the first determination unit determines that the estimated time will be reached before the maximum standby time is reached.

4. The encoding apparatus according to claim 3, wherein:
the change-timing determination unit further comprises a specifying unit configured to specify, if the first determination unit determines that the estimated time will be reached before the maximum standby time is reached, available bandwidths measured at the estimated time as reference available bandwidths that are referred to when the setting of the encoding condition is next changed, and
wherein, if the reference available bandwidths are specified, the change-timing determination unit determines, as the change timing, an earlier one of a first point in time at which the scheduled change time is reached and all of the reference available bandwidths are acquired and a second point in time at which the maximum standby time has elapsed.

5. The encoding apparatus according to claim 4, wherein:
the communication interface is further configured to connect to a plurality of communication devices,
the encoding apparatus further comprises a bandwidth estimation unit configured to estimate, for available bandwidths of each of the plurality of communication devices, whether the available bandwidth of a respective one of the communication devices is a lowest value among the available bandwidths of the communication devices based on any of: a mean value of one or more available bandwidths measured previously, a standard deviation of the one or more available bandwidths measured previously, a dispersion of the one or more available bandwidths measured previously, a latest available bandwidth measured previously, and a previous setting of the encoding condition, and
the specifying unit does not specify the available bandwidth as a reference available bandwidth unless the available bandwidth is the lowest value among the available bandwidths of the communication devices.

6. The encoding apparatus according to claim 4, wherein:
the estimation unit comprises a delay-time estimation unit configured to estimate a delay time based on a previous estimated time and a previous acquisition time, the delay time being the acquisition time when acquisition of the reference available bandwidth is delayed from the estimated time, the acquisition time being a time at which the available bandwidth is measured; and
the encoding apparatus further comprises:

a second determination unit configured to determine whether the delay time is reached after expiration of the maximum standby time, and
an extending unit configured to extend the maximum standby time if the second determination unit determines that the delay time is reached after an expiration of the maximum standby time.

7. The encoding apparatus according to claim 2, wherein the standby-time setting unit is further configured to set the maximum standby time based on transmission intervals of individual frames of the encoded data as specified by the encoding condition.

8. An method comprising:
measuring, by a computing device, an amount of available bandwidth for a communication device;
encoding, by the computing device, media data as encoded data to be transmitted to the communication device via a network;
determining, by the computing device, a scheduled change time at which the setting of an encoding condition is expected to be changed, the encoding condition being a condition used to encode the media data;
determining, by the computing device, whether the amount of available bandwidth has been measured;
determining a change timing, by the computing device based on the scheduled change time and the determination of whether the amount of available bandwidth has been measured, the change timing being one of:
the scheduled change time when the computing device measures the amount of available bandwidth on or before the scheduled change time; and
a point in time after the scheduled change time is reached and before a timing at which the computing device measures the amount of available bandwidth such that the setting of the encoding condition is not changed at the scheduled change time, in a case where the computing device is to measure the amount of available bandwidth after the scheduled change time; and
changing, by the computing device, the setting of the encoding condition in accordance with the measured amount of available bandwidth when the change timing is reached.

9. A non-transitory readable storage medium storing computer readable instructions that, when executed, cause an apparatus to:
measure an amount of available bandwidth for a communication device connected to the apparatus via a network;
encode media data;
determine a scheduled change time at which the setting of an encoding condition is expected to be changed, the encoding condition being a condition used to encode the media data;
determine whether the amount of available bandwidth has been measured;
determine a change timing, based on the scheduled change time and the determination of whether the amount of available bandwidth has been measured, the change timing being one of:
the scheduled change time when the apparatus determines the amount available bandwidth on or before the scheduled change time; and
a point in time after the scheduled change time is reached and before a timing at which the apparatus measures the available bandwidth such that the setting of the encoding condition is not changed at the scheduled change time, in a case where the apparatus is to measure the amount of available bandwidth after the scheduled change time; and change the setting of the encoding condition in accordance with the measured amount of available bandwidth when the determined change timing is reached.

10. The non-transitory readable storage medium according to claim 9, wherein the computer readable instructions further cause the apparatus to estimate a time at which the amount of available bandwidth is to be measured, and wherein determining the change timing comprises:

setting a maximum standby time during which a change of the setting of the encoding condition is deferred after the scheduled change time is reached;

determining whether the estimated time will be reached before the maximum standby time is reached; and determining the scheduled change time as the change timing if it is determined that the estimated time will not be reached before the maximum standby time is reached.

11. The non-transitory readable storage medium according to claim 10, wherein determining the change timing comprises:

setting a maximum standby time during which a change of the setting of the encoding condition is awaited after the scheduled change time is reached;

determining whether the estimated time will be reached before the maximum standby time is reached; and determining the point in time after the scheduled change time is reached and before the maximum standby time has elapsed as the change timing if it is determined that the estimated time will be reached before the maximum standby time is reached.

12. The non-transitory readable storage medium according to claim 11, wherein determining the change timing further comprises specifying, if it is determined that the estimated time will be reached before the maximum standby time is reached, available bandwidths measured at the estimated time as reference available bandwidths that are referred to when the setting of the encoding condition is next changed, and wherein if the reference available bandwidths are specified, determining the change timing includes determining, as the change timing, an earlier one of a first point in time at which the scheduled change time is reached and all of the reference available bandwidths are acquired and a second point in time at which the maximum standby time has elapsed.

13. The non-transitory readable storage medium according to claim 12, wherein the computer readable instructions further cause the apparatus to:

estimate, for available bandwidths of each of a plurality of communication devices connected to the apparatus via the network, whether the available bandwidth of a respective one of the communication devices is a lowest value among the available bandwidths of the communication devices based on any of: a mean value of one or more available bandwidths measured previously, a standard deviation of the one or more available bandwidths measured previously, a dispersion of the one or more available bandwidths measured previously, a latest available bandwidth measured previously, and a previous setting of the encoding condition, and not specifying the available bandwidth as a reference available bandwidth unless the available bandwidth is the lowest value among the available bandwidths of the communication devices.

14. The non-transitory readable storage medium according to claim 11, wherein estimating the time comprises estimating a delay time based on a previous estimated time and a previous acquisition time, the delay time being the acquisition time when acquisition of a reference available bandwidth is delayed from the estimated time, the acquisition time being a time at which the available bandwidth is measured, and wherein the computer readable instructions further cause the apparatus to determine whether the delay time is reached after expiration of the maximum standby time, and to extend the maximum standby time if it is determined that the delay time is reached after an expiration of the maximum standby time.

15. The non-transitory readable storage medium according to claim 10, wherein the setting the maximum standby time further comprises setting the maximum standby time based on transmission intervals of individual frames of the encoded data as specified by the encoding condition.

* * * * *